(12) United States Patent
Schwantes et al.

(10) Patent No.: US 7,985,445 B2
(45) Date of Patent: *Jul. 26, 2011

(54) WATER-IN-OIL CAPSULE MANUFACTURE PROCESS AND MICROCAPSULES PRODUCED BY SUCH PROCESS

(75) Inventors: Todd Arlin Schwantes, Lena, WI (US); Peggy Dorothy Sands, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,733

(22) Filed: Aug. 13, 2010

(65) Prior Publication Data

US 2010/0304023 A1    Dec. 2, 2010

Related U.S. Application Data

(62) Division of application No. 11/436,496, filed on May 18, 2006, now Pat. No. 7,803,422.

(51) Int. Cl.
*B01J 13/02* (2006.01)
(52) U.S. Cl. ............. 427/213.3; 428/402.2; 428/402.21; 428/402.22; 428/40.2; 264/4; 264/4.1
(58) Field of Classification Search .. 427/213.3–213.36; 428/402–402.24; 264/4–4.7
See application file for complete search history.

(56) References Cited

U.S. PATENT DOCUMENTS

| | | | | | |
|---|---|---|---|---|---|
| 5,596,051 | A | * | 1/1997 | Jahns et al. | 526/73 |
| 6,288,170 | B1 | * | 9/2001 | Waid | 525/113 |
| 6,387,995 | B1 | * | 5/2002 | Sojka | 524/291 |

* cited by examiner

*Primary Examiner* — James Seidleck
*Assistant Examiner* — S. Camilla Pourbohloul
(74) *Attorney, Agent, or Firm* — Benjamin Mieliulis

(57) ABSTRACT

A novel method of forming water in oil microcapsules is disclosed. According to the invention microcapsules are obtained by steps comprising dispersing an oil soluble amine modified polyfunctional polyvinyl monomer and an oil soluble bi- or polyfunctional vinyl monomer along with a thermal or UV free radical initiator (optionally included in one or both of the oil or water phases) and an organic acid into an internal phase oil; heating or UV exposing for a time (and temperature) sufficient to oligomerize the amine modified polyfunctional polyvinyl monomer and oil soluble bi- or polyfunctional vinyl monomer forming a pre-polymer. Thereafter the process involves adding to the oil phase oil a water phase comprising a dispersion in water of an anionic emulsifier (and optionally initiator), and adding an emulsifying agent. Emulsifying the water phase into the oil phase (W/O) is controlled through the quantity of water employed. The emulsion is then UV exposed or heated for a time (and temperature) sufficient to decompose the free radical initiators in the oil and/or water phases; thereby forming microcapsule wall material at the interface of the water and oil phases.

16 Claims, No Drawings

WATER-IN-OIL CAPSULE MANUFACTURE PROCESS AND MICROCAPSULES PRODUCED BY SUCH PROCESS

This is a divisional application of U.S. Ser. No. 11/436,496 filed May 18, 2006 now U.S. Pat. No. 7,803,422.

BACKGROUND OF THE INVENTION

1. Field of the Invention

This invention relates to capsule manufacturing processes and microcapsules produced by such processes.

2. Description of the Related Art

Various processes for microencapsulation, and exemplary methods and materials are set forth in Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et. al. (U.S. Pat. Nos. 2,800,458; 2,800,457 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Encapsulation" in Kirk Othmer, Encyclopedia of Chemical Technology, V.13, Second Edition, pages 436-456 and by Huber et. al. in "Capsular Adhesives", TAPPI, Vol. 49, No. 5, pages 41A-44A, May 1966, all of which are incorporated herein by reference.

More particularly, U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrene-sulfonic acid. Microcapsules are also taught in U.S. Pat. Nos. 2,730,457 and 4,197,346. Forming microcapsules from urea-formaldehyde resin and/or melamine formaldehyde resin is disclosed in U.S. Pat. Nos. 4,001,140; 4,081,376, 4,089,802; 4,100,103; 4,105,823; and 4,444,699. Alkyl acrylate-acrylic acid copolymer capsules are taught in U.S. Pat. No. 4,552,811. Each patent described throughout this application is incorporated herein by reference to the extent each provides guidance regarding microencapsulation processes and materials.

Interfacial polymerization is a process wherein a microcapsule wall of a polyamide, an epoxy resin, a polyurethane, a polyurea or the like is formed at an interface between two phases. U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization.

U.S. Pat. No. 5,292,835 teaches polymerizing esters of acrylic acid or methacrylic acid with polyfunctional monomers. Specifically illustrated are reactions of polyvinylpyrrolidone with acrylates such as butanediol diacrylate or methylmethacrylate together with a free radical initiator.

Common microencapsulation processes can be viewed as a series of steps. First, the core material which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Capsules made according to the invention can be made to better control permeability characteristics. Capsules made according to the invention are surprisingly better able to contain liquid contents without leakage over time. The capsules can be made less leaky than those made by comparable prior art processes. Alternatively permeability in certain applications is desired. Through selection of wall material and control of length of time of cross-linking or temperature of cross-linking, capsules can be made with differing permeability profiles from extremely tight with little to no leakage to capsules that have measurable permeability useful where a measurable release rate over time is desired.

The capsules according to the invention are useful with a wide variety of capsule contents ("core materials") including, by way of illustration and without limitation, dyes, perfumes, fragrances, cleaning oils, polishing oils, flavorants, sweeteners, chromogens, pharmaceuticals, fertilizers, herbicides, scents, and the like. The microcapsule core materials can include materials which alter rheology or flow characteristics, or extend shelf life or product stability. Essential oils as core materials can include, for example, by way of illustration wintergreen oil, cinnamon oil, clove oil, lemon oil, lime oil, orange oil, peppermint oil and the like. Dyes can include fluorans, lactones, indolyl red, I6B, leuco dyes, all by way of illustration and not limitation, The core material should be dispersible or sufficiently soluble in the capsule internal phase material namely in the internal phase oil or soluble or dispersible in the monomers or oligomers solubilized or dispersed in the internal phase oil. When the internal phase is water, the core material should be dispersible or sufficiently soluble in the water phase. The invention is particularly useful to encapsulate volatile fragrances and flavorants. When a water phase is being microencapsulated, with the oil phase serving as the continuous phase, the core material should be soluble or dispersible in the water phase so as to form a dispersion in water that can be emulsified into the oil phase.

Low capsule permeability is a sought after characteristic of microcapsules for many applications. Although various microencapsulation processes are known, a need has existed in particular for lower permeability and more durable capsules. Additionally, for certain applications, low permeability capsules that are heat sensitive are also desirable.

In alternative embodiments, capsules according to the invention are also able to be fashioned with thermoplastic polymeric materials resulting in low leakage heat sensitive capsules that could be opened with heat in addition to conventional techniques such as pressure, scraping, friction, shearing, impact, or other energy input. The capsules according to the invention can also be useful in applications with thermal print heads, or lasers, or other heating or impact elements. In alternative embodiments, if a light stimulated material is included, light sensitive capsules are also feasible.

The permeability characteristics of the capsules disclosed herein have versatility for a variety of applications. Wherever an internal phase is desired to be held securely over time but available to be exuded or released upon fracture or breakage of the capsules such as with application of pressure, a low permeability capsule according to the invention can be fashioned. Where measurable release is desired, more permeable capsules can also be fashioned.

SUMMARY OF THE INVENTION

A novel method of forming water in oil, and oil in water microcapsules is disclosed. According to the invention microcapsules are obtained through either oil in water (O/W) or water in oil (W/O) emulsifications. In one embodiment microcapsules are obtained by steps comprising dispersing an oil soluble amine modified polyfunctional polyvinyl monomer (or oligomer) and an oil soluble bi- or polyfunctional vinyl monomer or oligomer along with a free radical initiator such as an azo or peroxy initiator and an organic acid into an internal phase oil which is a non-solvent for the water phase. The phase in excess is water with O/W emulsification. With W/O emulsifications the phase in excess or continuous phase is oil. The term internal phase oil is used for convenience and simplicity to refer to the oil phase and to refer to the type of oils conventionally used as the internal phase or contents of microcapsules in conventional microencapsulation (with the W/O emulsifications taught herein, the oil however ends up being the continuous phase. The water phase forms the capsule internal contents. The term "oil phase" is intended to refer to the oil phase oil.) The oil phase dispersion is heated for a time and temperature sufficient to oligomerize the amine modified polyfunctional polyvinyl monomer or oligomer and oil soluble bi- or polyfunctional vinyl monomer or oligomer forming a pre-polymer. The next step is adding to the oil phase a water phase comprising a dispersion in water of an anionic emulsifier and an optional second initiator which can be the same or different such as an azo or peroxy initiator. This water phase is emulsified into the oil phase (W/O) followed by heating for a time and temperature sufficient to decompose at least one of the free radical initiators, which can be placed in either or both of the oil and/or water phases; thereby forming microcapsule wall material at the interface of the water and oil phases. A third heating step is used to polymerize the formed wall material and in the process, preferably decomposing any remaining initiator.

In a second embodiment, microcapsules are obtained by steps comprising dispersing an oil soluble amine modified ethoxylated trimethylol propane triacrylate and an oil soluble diethylene glycol dimethacrylate along with a free radical initiator such as an azo initiator and an organic acid into an internal oil phase; heating for time and temperature sufficient to oligomerize the amine modified ethoxylated trimethylol propane triacrylate and a diethylene glycol dimethacrylate forming a pre-polymer; then, adding to the oil phase a water phase comprising a dispersion of water, and an anionic emulsifier acid, and an optional second initiator. The water phase is then emulsified into the oil phase (W/O) and heated for a time and temperature sufficient to decompose at least one of the free radical initiators in either or both of the oil and water phases; thereby forming microcapsule wall material at the interface of the water and oil phases.

In an alternative embodiment involving an oil in water (O/W) emulsion, microcapsules are obtained by steps comprising dispersing an oil soluble amine modified polyfunctional polyvinyl monomer and an oil soluble bi- or polyfunctional vinyl monomer or oligomer along with a free radical azo initiator and an organic acid into an internal phase; then, heating for a time and temperature sufficient to oligomerize or further oligomerize the amine modified polyfunctional polyvinyl monomer or oligomer and oil soluble bi- or polyfunctional vinyl monomer forming a pre-polymer; then, adding to the oil phase a water phase in excess comprising a dispersion in water of an anionic emulsifier and an optional second initiator, and adding an emulsifying agent; emulsifying the oil phase into the water phase; then heating for a time and temperature sufficient to decompose the free radical initiators in either or both of the oil and water phases; thereby forming microcapsule wall material at the interface of the water and oil phases.

In yet another embodiment involving an oil in water emulsion (O/W) process, microcapsules are obtained by steps comprising dispersing an oil soluble amine modified ethoxylated trimethylol propane triacrylate and an oil soluble diethylene glycol dimethacrylate along with a free radical initiator such as an initiator and an organic acid into an internal phase oil; heating for time and temperature sufficient to oligomerize the amine modified ethoxylated trimethylol propane triacrylate and a diethylene glycol dimethacrylate forming a pre-polymer; then, adding to the internal phase oil a water phase comprising a dispersion of water, and an emulsifier such as a polyacrylic or polymethacrylic acid, emulsifying the oil phase into the water phase; then heating for a time and temperature sufficient to decompose the free radical initiators in the oil and water phases; thereby forming microcapsule wall material at the interface of the water and oil phases. Optionally, the free radical initiator can be included in one or both of the oil and water phase.

In one embodiment the invention comprises microcapsules obtained by steps comprising dispersing an oil soluble amine modified polyfunctional polyvinyl monomer or oligomer and an oil soluble bi- or polyfunctional vinyl monomer or oligomer along with a free radical initiator and an organic acid into an internal phase oil. A first heating step is used comprising, heating for a time and temperature sufficient to oligomerize or further oligomerize the amine modified polyfunctional polyvinyl monomer or oligomer and oil soluble bi- or polyfunctional vinyl monomer oligomer forming a pre-polymer. A water phase comprising a dispersion in water of an anionic emulsifier and a free radical initiator is added to the internal phase oil. The water phase is emulsified into the oil phase. A second heating step is used comprising, heating for a time and temperature sufficient to decompose the free radical initiators in the oil and water phases thereby forming microcapsule wall material at the interface of and oil phases. Then a third heating step comprising heating to a temperature equal to or greater than the second heating step temperature is used for a time sufficient to polymerize the wall material. The free radical initiator is preferably selected from an azo or peroxy initiator. Oligomerization in one embodiment is accomplished by heating, in the first heating step, to at least 55° C. for at least one hour to form the prepolymer.

In an alternative embodiment the initiator in the oil phase decomposes at a first temperature and the initiator in the water phase decomposes at a second temperature. In a yet further embodiment the invention comprises microcapsules obtained by steps comprising dispersing an oil soluble amine modified polyfunctional polyvinyl monomer or oligomer and an oil soluble bi- or polyfunctional vinyl monomer or oligomer along with a free radical initiator and an organic acid into an internal phase oil; a first heating step comprising, heating for a time and temperature sufficient to oligomerize or further oligomerize the amine modified polyfunctional polyvinyl monomer or oligomer and oil soluble bi- or polyfunctional vinyl monomer or oligomer forming a pre-polymer; adding to the internal phase oil a water phase in excess comprising a dispersion in water of a polyacrylic or polymethacrylic acid and a free radical initiator, and adding an emulsifying agent; emulsifying the oil phase into the water phase; and a second heating step comprising, heating for a time and temperature sufficient to decompose the free radical initiator in the oil and water phases; thereby forming microcapsule wall material at the interface of the water and oil phases; and, a third heating step comprising heating to a temperature equal to or greater than the second heating step temperature for a time sufficient to polymerize the wall material.

In one embodiment the oligomerization is accomplished by heating, in the first heating step, is to at least 55° C. for at least one hour to form the prepolymer and the third heating step is to at least 90° C. for at least three hours. The second heating step comprised heating to a temperature equal to or greater than the first step, preferably greater. The second step temperature could involve dropping the temperature slightly less than the first step, if only prolonged heating is needed to degrade any remaining free radical initiator.

In a yet further embodiment microcapsules are obtained by steps comprising dispersing an oil soluble amine modified ethoxylated trimethylol propane triacrylate and an oil soluble diethylene glycol dimethacrylate along with free radical initiator and an organic acid into an internal phase oil. A first heating step is used comprising, heating for time and temperature sufficient to oligomerize the amine modified ethoxylated trimethylol propane triacrylate and a diethylene glycol dimethacrylate forming a pre-polymer; then adding to the internal phase oil a water phase comprising a dispersion of water, and a polyacrylic or polymethacrylic acid, and adding an emulsifying agent; and emulsifying the water phase into the oil phase. A second heating step then comprises, heating for a time and temperature sufficient to decompose at least a portion of the free radical initiator in the oil phase, thereby forming microcapsule wall material at the interface of the water and oil phases; and a third heating step comprising heating to at least 90° C. for at least three hours to polymerize the wall material.

In one embodiment the third heating step comprises heating to at least 90° C. for at least three hours.

In a further embodiment a second initiator is added in addition to the water phase and the initiator in the oil phase decomposes at a first temperature and the initiator in the water phase decomposes at a second temperature.

In a yet further embodiment, the initiators in the oil phase and the water phase can be the same or different.

In a further embodiment microcapsules are obtained by steps comprising: dispersing an oil soluble amine modified polyfunctional polyvinyl monomer or oligomer and an oil soluble bi- or polyfunctional vinyl monomer or oligomer along with a free radical initiator and an organic acid into an internal phase oil; a first heating step comprising heating for a time and temperature sufficient to decompose at least some portion of the free radical initiator and thereby oligomerize or further oligomerize the amine modified polyfunctional polyvinyl monomer or oligomer and oil soluble bi- or polyfunctional vinyl monomer or oligomer forming a pre-polymer. Added to the internal phase oil is a water phase comprising a dispersion in water of an anionic emulsifier, and emulsifying the water phase into the oil phase forming droplets of the water phase dispersed in the oil phase. A second heating step comprising heating for a time and temperature sufficient to decompose the remaining portion of free radical initiator thereby forming microcapsule wall material from prepolymer at the interface of the water and oil phases. A third heating step comprises heating to a temperature equal to or greater than the second heating step temperature for a time sufficient to polymerize the wall material.

In one embodiment the oligomerization is accomplished by heating, in the first heating step, to at least 55° C. for at least one hour to form the prepolymer.

In a further embodiment the third heating step comprises heating to at least 90° C. for at least three hours. In a further embodiment, the initiator is added in addition to the water phase dispersion of anionic emulsifier, and the initiator in the oil phase decomposes at a first temperature and the initiator in the water phase decomposes at a second temperature. The initiators in the oil and water phases can be the same or different.

In a further embodiment microcapsules are obtained by steps comprising providing an internal phase oil and a water phase containing a free radical initiator in at least one of said phases, and dispersing an oil soluble amine modified polyfunctional polyvinyl monomer or oligomer and an oil soluble bi- or polyfunctional vinyl monomer or oligomer and an organic acid into the internal phase oil; then adding to the internal phase oil the water phase which further comprises a dispersion in water of an anionic emulsifier, and emulsifying the water phase into the oil phase forming droplets of the water phase in the oil phase.

A first heating step comprises, heating for a time and temperature sufficient to decompose the free radical initiator in at least the oil or water phase, and sufficient to oligomerize or further oligomerize the amine modified polyfunctional polyvinyl monomer or oligomer and oil soluble bi- or polyfunctional vinyl monomer or oligomer forming a pre-polymer and thereby forming microcapsule wall material at the interface of the water and oil phases.

A second heating step comprises heating to a temperature equal to or greater than the first heating step temperature for a time sufficient to polymerize the wall material.

In one embodiment the second heating step comprises heating to at least 90° C. for at least three hours. Alternatively, initiator can be added to both the oil and water phases. Optionally, the initiator in the oil phase can decompose at a first temperature and the initiator in the water phase can decompose at a second temperature. The initiators in the oil and water phases can be the same or different.

In a yet further embodiment microcapsules are obtained by steps comprising dispersing an oil soluble amine modified polyfunctional polyvinyl monomer or oligomer and an oil soluble bi- or polyfunctional vinyl monomer or oligomer along with a free radical initiator and an organic acid into an internal phase oil. A first heating step comprises heating for a time and temperature sufficient to decompose at least some portion of the free radical initiator and thereby oligomerize the amine modified polyfunctional polyvinyl monomer or oligomer and oil soluble bi- or polyfunctional vinyl monomer or oligomer forming a pre-polymer.

Added to the internal phase oil is a water phase in excess, the water phase comprising a dispersion in water of an anionic emulsifier. Emulsifying the oil phase into the water phase forms droplets of the oil phase dispersed in the water phase. High shear agitation is used. A second heating step comprises heating for a time and temperature sufficient to decompose the remaining portion of free radical initiator thereby forming microcapsule wall material from prepolymer at the interface of the water and oil phases. The organic acid is believed to contribute to the tendency of the prepolymer to gravitate to the interface. This could be due to charge effects. A third heating step comprises heating to a temperature equal to or greater than the second heating step temperature for a time sufficient to polymerize the wall material.

In a yet further embodiment microcapsules are obtained by steps comprising providing an internal phase oil and a water phase containing a free radical initiator in at least one of said phases; and dispersing an oil soluble amine modified polyfunctional polyvinyl monomer or oligomer and an oil soluble bi- or polyfunctional vinyl monomer or oligomer and an organic acid into the internal phase oil. Added to the internal phase oil is a water phase in excess, the water phase further comprising a dispersion in water of an anionic emulsifier. The oil phase is emulsified into the water phase forming droplets of the oil phase in the oil phase. A first heating step comprises, heating for a time and temperature sufficient to decompose the free radical initiator in at least the oil or water phase, and sufficient to oligomerize or further oligomerize the amine modified polyfunctional polyvinyl monomer and oil soluble bi- or polyfunctional vinyl monomer or oligomer forming a pre-polymer and thereby forming microcapsule wall material at the interface of the water and oil phases. A second heating step comprising heating to a temperature equal to or greater than the first heating step temperature for a time sufficient to polymerize the wall material.

In a yet further embodiment microcapsules are obtained by steps comprising providing an internal phase oil and a water phase containing a free radical UV initiator and free radical thermal initiator in at least one of said phases; dispersing an oil soluble amine modified polyfunctional polyvinyl monomer or oligomer and an oil soluble bi- or polyfunctional vinyl monomer or oligomer and an organic acid into the internal phase oil; and adding to the internal phase oil the water phase which further comprises a dispersion in water of an anionic emulsifier, and emulsifying with high shear agitation the water phase into the oil phase forming droplets of the water phase in the oil phase. A first free radical initiating step comprises, exposing with UV light the water phase and oil phase emulsion for a time sufficient to decompose the UV free radical initiator in at least the oil or water phase, and sufficient to oligomerize or further oligomerize the amine modified polyfunctional polyvinyl monomer or oligomer and oil soluble bi- or polyfunctional vinyl monomer or oligomer forming a pre-polymer and thereby forming microcapsule wall material at the interface of the water and oil phases. A second free radical initiating step comprising heating to a temperature sufficient to decompose the free radical thermal initiator and heating for a time sufficient to polymerize the wall material.

In a further embodiment the free radical initiators can each be selected from an azo initiator. In one embodiment the heating step involves heating to at least 55° C. for at least one hour to polymerize the wall material. The heating step can comprise heating to at least 90° C. for at least three hours. Other temperatures and times can be used in the other embodiments. Optionally, initiator is added to both the oil and water phases. In one embodiment the initiator in the oil phase decomposes upon exposure to UV light and the initiator in the water phase decomposes at a first selected temperature. The initiators in the oil and water phases can be the same or different. In one embodiment the initiators are both UV initiators and the second free radical initiating step comprises exposing to UV light for a time sufficient to polymerize the wall material.

In a yet further embodiment microcapsules are obtained by steps comprising dispersing an oil soluble amine modified polyfunctional polyvinyl monomer or oligomer and an oil soluble bi- or polyfunctional vinyl monomer or oligomer along with a UV free radical initiator and an organic acid into an internal phase oil. A first free radical initiating step comprising exposing with UV light for a time sufficient to decompose at least some portion of the free radical initiator and thereby oligomerize the amine modified polyfunctional polyvinyl monomer or oligomer and oil soluble bi- or polyfunctional vinyl monomer or oligomer forming a pre-polymer. A water phase in excess, is added to the internal phase oil. The water phase comprises a dispersion in water of an anionic emulsifier. Emulsifying the oil phase into the water phase using high shear agitation form droplets of the oil phase dispersed in the water phase. A second free radical initiating step comprises exposing with UV light for a time sufficient to decompose the remaining portion of free radical initiator thereby forming microcapsule wall material from prepolymer at the interface of the water and oil phases. A third free radical initiating step comprises generating free radicals for a time sufficient to polymerize the wall material. In one embodiment the free radical initiator is selected from a phenyl ketone, benzoinether, benzoil ketal, or azo initiator. In an alternate embodiment the oligomerization is accomplished by exposing to UV, light in the first free radical initiating step, for at least one hour to form the prepolymer.

In a further embodiment the third free radical initiating step comprises exposing to UV for at least three hours. A second initiator can be added in addition to the oil phase and the initiator in the oil phase can be selected to decompose at a set first temperature (based on half life of initiator, as is commonly understood with free radical initiators).

In a yet further embodiment microcapsules are obtained by steps comprising providing an internal phase oil and a water phase containing a first free radical UV initiator in at least one of said phases, and dispersing an oil soluble amine modified polyfunctional polyvinyl monomer or oligomer and an oil soluble bi- or polyfunctional vinyl monomer or oligomer and an organic acid into the internal phase oil. Added to the internal phase oil is the water phase in excess. The water phase further comprises a dispersion in water of an anionic emulsifier. Emulsifying the oil phase into the water phase forms droplets of the oil phase in the water phase.

A first free radical initiating step comprises exposing with UV light for a time sufficient to decompose the free radical initiator in at least the oil or water phase, and sufficient to oligomerize or further oligomerize the amine modified polyfunctional polyvinyl monomer and oil soluble bi- or polyfunctional vinyl monomer or oligomer forming a pre-polymer thereby forming microcapsule wall material at the interface of the water and oil phases. A second free radical initiating step comprises exposing with UV light for a time sufficient to polymerize the wall material or heating for a time and temperature sufficient to polymerize the wall material. Optionally the free radical initiator is selected from an azo initiator. The first free radical initiating step can involve exposure with a UV light source or an electron beam for at least one hour.

The second heating step optionally can comprise heating to at least 90° C. for at least three hours in certain embodiments. A second initiator can be added in addition to the water and oil phase and wherein the second initiator can be selected to decompose at a first temperature. Optionally, the first initiator is added to both the oil phase and the water phase with the first initiators being the same or different in each phase. The first initiators can be UV initiators, and the second initiator can be a thermal free radical initiator. Other such variations will be readily evident to the skilled artisan.

DETAILED DESCRIPTION

The present invention teaches novel processes for microencapsulation involving water in oil, or oil in water emulsifications, and microcapsules obtained by such processes.

More particularly, the present invention in one embodiment is a process of obtaining microcapsules by dispersing an oil soluble amine modified polyfunctional polyvinyl monomer or oligomer and an oil soluble bi- or polyfunctional vinyl monomer or oligomer along with a free radical initiator, such as an azo or peroxy initiator, and an organic acid into an internal phase oil. This dispersion is heated for a time and temperature sufficient to oligomerize or further oligomerize the amine modified polyfunctional polyvinyl monomer and oil soluble bi- or polyfunctional vinyl monomer or oligomer to form a prepolymer. To this internal phase oil and prepolymer, a water phase is added comprising a dispersion in water of an anionic emulsifier or an initiator. The water phase in one embodiment is emulsified into the oil phase (W/O). The dispersion is then heated for a time and temperature sufficient to decompose the free radical initiator, which can be placed in one or both of the oil and water phases. Microcapsule wall material is thereby formed at the interface of the water and oil phases. A third heating step is used to polymerize or harden the formed wall material and usefully to decompose remaining initiator. Decompose the free radical initiator means that the initiator is consumed and in the process generates free radicals for furthering propagation of polymerization reaction of the monomers and oligomers.

In forming the capsules of the invention, the emulsion is usually milled to a size of 0.1 to 80 microns, preferably 0.5 to 10 microns, more preferably 1 to 8 microns. Larger sizes for particular applications are also feasible.

Unlike conventional microencapsulation processes, the W/O and O/W processes taught herein employing an organic acid are believed to drive wall material from the oil phase to the oil water interface, though the application and invention should not be construed as limited to this proposed mechanism.

The invention teaches novel processes for microencapsulation using water in oil, or alternatively oil in water emulsifications. The capsules by the process of the invention enable a low permeability or controlled permeability capsule to be fashioned. Permeability can be controlled through wall material selection, through control of degree of cross-linking, by controlling temperature of cross-linking, by controlling length of time of cross-linking or with UV initiated systems by controlling intensity of UV light and duration.

In an alternative embodiment, the present invention is a process of obtaining microcapsules by dispersing an oil soluble amine modified polyfunctional polyvinyl monomer or oligomer and an oil soluble bi- or polyfunctional vinyl monomer or oligomer along with a free radical initiator, such as a peroxy or azo initiator, and an organic acid into an internal phase oil. This dispersion is heated for a time and temperature sufficient to oligomerize or further oligomerize the amine modified polyfunctional polyvinyl monomer and oil soluble bi- or polyfunctional vinyl monomer to form a prepolymer. To this internal phase oil and prepolymer, a water phase is added in excess comprising a dispersion in water of an anionic emulsifier and optionally, a free radical initiator. The oil phase in this embodiment is emulsified into the water phase (O/W). The dispersion is then heated for a time and temperature sufficient to decompose the free radicals, positioned in one or both of the oil and water phases. Microcapsule wall material is thereby formed at the interface of the water and oil phases.

In yet another embodiment, the invention is a process of obtaining microcapsules by dispersing an oil soluble amine modified ethoxylated propane triacrylate and an oil soluble diethylene glycol dimethacrylate along with a free radical initiator and an organic acid into an internal phase oil. This dispersion is heated for a time and temperature sufficient to oligomerize the amine modified ethoxylated trimethylol propane triacrylate and a diethylene glycol dimethacrylate forming a prepolymer. To this internal phase oil and prepolymer, a water phase is added comprising a dispersion in water of an anionic emulsifiers such as a polyacrylic or polymethyacrylic acid and an initiator such as an azo or peroxy initiator. The water phase is emulsified into the (W/O) oil phase (or alternatively the oil phase is emulsified into the water phase (O/W), if an excess of water is used). The dispersion is then heated for a time and temperature sufficient to decompose the free radical initiator which can be in one or both of the oil and water phases. Microcapsule wall material is thereby formed at the interface of the water and oil phases.

Preferred amine modified polyfunctional polyvinyl monomers include amine modified ethoxylated trimethylol propane triacrylate, ethoxylated aliphatic, acrylated amines, such as diacrylate amines, triacrylate amines dimethacrylate amines, amine modified polyetheracrylates and amine modified polyethermethacrylates.

Preferred bi- or polyfunctional vinyl monomers include by way of illustration and not limitation, allyl methacrylate; triethylene glycol dimethacrylate; ethylene glycol dimethacrylate, diethylene glycol dimethacrylate, aliphatic or aromatic urethane diacrylates, difunctional urethane acrylates, ethoxylated aliphatic difunctional urethane methacrylates, aliphatic or aromatic urethane dimethacrylates, epoxy acrylates, epoxymethacrylates; tetraethylene glycol dimethacrylate; polyethylene glycol dimethacrylate; 1,3 butylene glycol diacrylate; 1,4-butanediol dimethacrylate; 1,4-butaneidiol diacrylate; diethylene glycol diacrylate; 1,6 hexanediol diacrylate; 1,6 hexanediol dimethacrylate; neopentyl glycol diacrylate; polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethylacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethyloipropane tetraacrylate, dipentaerythritol pentaacrylate, ethoxylated pentaerythritol tetraacrylate.

The organic acid can be selected from various acids such as carboxy acids, with monoalkyl maleates such as monomethyl, monoethyl or monobutyl maleate being preferred, with monobutyl maleate being most preferred. Other organic acids that can be usefully employed in the invention include, organic sulfonic acids such as alkyl benezene sulfonic acid, more particularly linear alkyl benzene sulfonic acid, tridecylbenzene sulfonic acid, more particularly linear trialkyl benzene sulfonic acid such as linear tridecyl benzene sulfonic acid, alkyldiphenyloxide sulfonic acid, preferably dodecyl diphenyl oxidedisulfonic acid, more particularly branched C12 diphenyl oxide disulfonic acid, alkylbenzene sulfonic acid, more particularly, dodecyl benzene sulfonic acid, dialkyl naphthalene disulfonic acid, more particularly dinonylnaphthalene disulfonic acid, 4-hydrozino benzene sulfonic acid, and the like. Desirably the organic acid is selected to be dispersible in the oil phase and sparingly soluble in the water phase.

Anionic emulsifiers include by way of illustrating and not limitation, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, poly(styrene sulfonate), isobutylene-maleic anhydride copolymer, gum arabic, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates. The amount of anionic emulsifier is anywhere from about 0.1 to about 40 percent by weight of all constitutents, more preferably from 0.5 to about 10 percent, more preferably 0.5 to 5 percent by weight. Typically emulsifier is employed at 2 to about 10% by weight.

After solvent, the amine modified polyfunctional polyvinyl monomer and the oil soluble bi- or poly functional vinyl monomers are the larger constituents by weight used in a relative ratio of from about 0.5:1 to about 1:3 preferably from about 1:1 to about 1:2.

The average molecular weight of the monomers initially is in the hundreds of daltons. For the oligomer molecular weights are in the thousands to tens of thousands of daltons. Prepolymers accordingly are higher molecular weight still. Prepolymers are an intermediate block of oligomers and monomers eventually forming a polymer. The monomer or oligomers should be selected to be soluble or dispersible in the oil phase.

For example, assuming a system of about 600 grams with solvent, the largest constitutents are typically solvent, 10 to 70 weight percent, preferably 35-65 weight percent oil phase solvent and oil; 10 to 70 percent, preferably 35-65 weight percent water; 0.1 to 20 weight percent, usually 0.5 to 8 weight percent, preferably 2 to 6 weight percent, bi- or polyfunctional vinyl monomer or oligomer; 0.1 to 20 weight percent, usually 0.5 to 8 weight percent, preferably 2 to about 4 weight percent, amine modified amine modified polyfunctional monomer or oligomer. Initiator is 10% or less, usually about 1% or less, preferably 0.5% by weight or less and more preferably 0.1% or less.

As will be evident, the amount of the respective solvent or oil can be increased or decreased as needed for rheology and depending on whether an W/O or O/W system is desired.

Preferred free radical initiators include peroxy initiators, azo initiators, peroxides, and compounds such as 2,2'-azobis-methylbutyronitrile, dibenzoyl peroxide. More particularly, and without limitation the free radical initiator can be selected from the group of initiators comprising an azo or peroxy initiator, such as peroxide, dialkyl peroxide, alkyl peroxide, peroxyester, peroxycarbonate, peroxyketone and peroxydicarbonate, 2,2'-azobis (isobutylnitrile), 2,2'-azobis(2,4-dimethylpentanenitrile), 2,2'-azobis (2,4-dimethylvaleronitrile), 2,2'-azobis(2-methylpropanenitrile), 2,2'-azobis (methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like. Blends of initiators can also be employed. Initiators are available commercially, such as Vazo initiators, which typically indicate a decomposition temperature for the initiator. Preferably the initiator is selected to have a decomposition point of about 50° C. or higher. Usefully multiple initiators are employed, either as a blend in the oil phase, or in either of the oil or water phases. Preferably initiators are selected to stagger the decomposition temperatures at the various steps, pre-polymerization, wall formation and hardening or polymerizing of the capsule wall material. For example, a first initiator in the oil phase can decompose at 55° C., to promote prepolymer formation, a second can decompose at 60° C. to aid forming the wall material. Optionally a third initiator can decompose at 65° C. to facilitate polymerization of the capsule wall material. The amount of each initiator can be typically as low as 0.1 weight percent or as high as 10 weight percent.

Internal phase oils, or oil phase, or oil solvent or "nonsolvent for the water phase," used interchangeably for purposes hereof can be selected from solvents and the solvents can include by way of illustration and not limitation, ethyldiphenylmethane, butyl biphenyl ethane, benzylxylene, alkyl biphenyls such as propylbiphenyl and butylbiphenyl, dialkyl phthalates e.g. dibutyl phthalate, dioctylphthalate, dinonyl phthalate and ditridecylphthalate; 2,2,4-trimethyl-1,3-pentanediol dilsobutyrate, alkyl benzenes such as dodecyl benzene; alkyl or aralkyl benzoates such as benzyl benzoate; diaryl ethers, di(aralkyl)ethers and aryl aralkyl ethers, ethers such as diphenyl ether, dibenzyl ether and phenyl benzyl ether, liquid higher alkyl ketones (having at least 9 carbon atoms), alkyl or aralky benzoates, e.g., benzyl benzoate, alkylated naphthalenes such as dipropylnaphthalene, partially hydrogenated terphenyls; high-boiling straight or branched chain hydrocarbons, alkaryl hydrocarbons such as toluene, vegetable oils such as canola oil, soybean oil, corn oil, sunflower oil, or cottonseed oil, methyl esters of fatty acids derived from transesterification of canola oil, soybean oil, cottonseed oil, corn oil, sunflower oil, pine oil, lemon oil, olive oil, or methyl ester of oleic acid, vegetable oils, esters of vegetable oils, e.g. soybean methyl ester, straight chain saturated paraffinic aliphatic hydrocarbons of from 10 to 13 carbons. Mixtures of the above can also be employed. Common diluents such as straight chain hydrocarbons can also be blended with the solvents, or blend of solvents. The solvent is selected on the basis of hydrophobicity and ability to disperse or solvate the amine modified polyfunctional polyvinyl monomer and the bi- or polyfunctional vinyl monomer or oligomer. "Internal phase oil" is herein to described as a type of oil material commonly able to be used as the oil in conventional microencapsulation. In conventional microencapsulation, the internal phase oil ends up as the core or internal contents of the microcapsule. In the processes of the invention which involve water in oil (W/O) emulsifications, the internal phase oil is used in excess and the water then becomes the capsule core. The term in this context describes a type of oil, but for clarity shall be understood as not necessarily forming the capsule core when water in oil emulsifications are being done. Internal phase oil is describing a nonsolvent for the water phase in such context.

The microencapsulation process in certain of the embodiments is believed to rely on the organic acid for formation of a changed species that drives the wall material to the oil water interface.

The size of the capsules can be controlled by adjusting the speed of agitation. Smaller size dispersions are achieved through faster agitation resulting in smaller capsules.

Emulsifying agents or protective colloids can be conveniently employed to facilitate dispersion. Such materials for example include carboxylated or partially hydrolyzed polyvinyl alcohol, methyl cellulose, and various latex materials, stearates, lecithins, and various surfactants.

The microcapsules according to the invention can be used to microencapsulate various core materials such as chromogens and dyes, flavorants, perfumes, sweeteners, fragrances, oils, fats, pigments, cleaning oils, pharmaceuticals, pharmaceutical oils, perfume oils, mold inhibitors, antimicrobial agents, adhesives, phase change materials, scents, fertilizers, nutrients, and herbicides by way of illustration and without limitation.

Microencapsulation can facilitate processing by increasing particle size or by converting liquids into free flowing solids. The largest volume applications of microcapsules are in imaging systems such as carbonless papers.

The microcapsule wall can serve the purpose of extending shelf life, stabilize and protect the core material, mask strong flavors, or protect contents so that they are available to participate in reactions such as imaging or adhesive formation when the capsule wall is ruptured, sheared, fractured, broken or melted.

The core material can be a minor or major constituent of the material encapsulated by the microcapsules. If the core material can function as the oil or water solvent in the capsules, it is possible to make the core material the major or total material encapsulated. Usually however, the core material is from 0.01 to 99 weight percent of the capsule internal contents, preferably 0.01 to about 65 by weight of the capsule internal contents, and more preferably from 0.1 to about 45% by weight of the capsule internal contents. With certain especially potent materials, the core can be at just trace quantities.

In the alternative embodiment, any of the heating steps in the microencapsulation process can be replaced with a UV or light induced or electron beam induced free radical generation step.

More particularly, in this alternative embodiment the invention is a process of obtaining microcapsules by dispersing an oil soluble amine modified polyfunctional monomer or oligomer and an oil soluble bi- or polyfunctional vinyl monomer or oligomer along with a UV initiator. Optionally a visible light induced free radical generator could also be used. An organic acid is also added to the internal phase oil. This dispersion is then subjected to UV light to form a prepolymer. To this internal phase oil and prepolymer, a water phase is added comprising a dispersion in water of an anionic emulsifier. Optionally either a UV initiator or alternatively thermal initiator or alternatively no initiator is added to the water phase. The water phase is emulsified into the oil phase (W/O), or alternatively an excess of the water phase is used and the oil phase is emulsified into the water phase (O/W). Depending on the type of initiator or initiators, the dispersion is then subjected to UV light or heated (as appropriate to the initiator) to generate free radicals.

As polymerization progresses, microcapsule wall material forms at the interface of the water and oil phases. A third UV exposure or heating step is used to further polymerize or harden the formed wall material.

Similar substitution of UV initiator can be made in any of the microencapsulation processes described herein and by substitution of a respective UV exposure step for the respective thermal heating step.

UV initiators include benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-disec-butoxyacetophenone; 2,2-dimethoxy-1,2-diphenylethan-1-one; dimethoxyketal; and phenyl glyoxal2, 2'-diethoxyacetophenone, hydroxycyclohexyl phenyl ketone, alpha-hydroxyketones, alpha-amino-ketones, alpha and beta naphthyl carbonyl compounds, benzoin ethers such as benzoin methyl ether, benzil, benzil ketals such as benzil dimethyl ketal, acetophenone, fluorenone, 2-hydroxy-2-methyl-1-phenylpropan-1-one. UV initiators of this kind are available commercially, e.g., IRGACURE 184™ or DEGACURE 1173™ from Ciba. Thermal initiators are available from DuPont. The fraction of the photoinitiator in any of the water or oil phase is approximately from about 0.1 to 10%, preferably 0.1 to about 6% by weight, more preferably 0.5 to 2.5 weight percent. Similar weight percent ranges can also be applied to the thermal initiators.

UV initiators can be included in substitution as an alternate initiator system (for any heating step or steps of the encapsulation process, or as an additional initiator system. This produces an initiator system for polymerization or oligomerization using a dual cure method or optional thermal or optional light or optional UV initiated method by appropriate selection of initiator and initiation method or methods. In an alternative embodiment of the invention, azo compounds that can be excited or split by UV light or high-energy radiation are used alone or in combination with thermal free radical initiators. In a yet alternative embodiment, the combination of thermal and UV initiators is formed only by azo compounds.

In a yet further embodiment, for specialized microencapsulation processes, the use of initiators, e.g., thioxanthones, phosphine oxides, metallocenes, tertiary aminobenzenes or tertiary aminobenzophenones, which break down into free radicals on exposure to visible light is effectively used. Such microencapsulation systems however typically require special handling of the system to prevent premature polymerization or oligomerization by appropriate control of lighting conditions.

For light activated microencapsulation, the use of UV initiators are preferred, or a combination of UV initiators and thermal free radical initiators. This combination can impart considerable versatility to the microencapsulation steps of the process where any step or steps of the microencapsulation process then can be initiated either by appropriate selection of an initiator decomposing at specific temperatures or decomposing under specific light conditions.

In a yet further embodiment, with appropriate selection of monomers and initiators, the respective monomers in the process can be polymerized or oligomerized using some suitable means such as heat (used with thermal initiators) or UV light (for use with UV initiators), or electron beam. When replacing the UV radiation with electron beam, the addition of initiators is not absolutely essential or amounts employed can be reduced. Options for individual heating steps of the encapsulation process include the freedom to use in substitution for any heating step, the use of visible light with suitable initiators, the use of UV light with suitable UV initiators, or ionizing radiation (e.g. electron beam or gamma ray) without initiators or reduced amounts of initiator.

UV initiators may be selected from those organic chemical compounds conventionally employed to promote UV-initiated formation of radicals. A preferred UV initiator is 1-hydroxycyclohexyl phenyl ketone because of the rapidity with which it generates free radicals when exposed to UV radiation. Mixtures of UV initiators or mixtures with thermal initiators may also be used. This is often desirable because it provides more efficient production of radicals in certain cases. In general, the UV initiator will be present in an amount of 0.1 to 10.0 weight percent in any of the water or oil phases, based on the total weight of all constituents. However, it is preferable to use between 0.5-2.5 weight percent UV initiator, most preferably 0.5-1.0 weight percent UV initiator, based on total weight.

The amount of each initiator, thermal, UV or light, that is employed can vary, and is dependent upon factors such as the monomer or oligomer material that is polymerized or further oligomerized. Typically, the amount of initiator ranges from about 0.1 to about 6 percent, and often about 1 to about 3 percent, based on the weight of all constituents.

EXAMPLES

Example 1

Oil in Water Capsules

| | | |
|---|---|---|
| Water Phase: | 25 grams | acrylic acid butyl acrylate copolymer |
| | 2 grams | 4,4'-azobis(4-cyano valeric acid) |
| | 300 grams | Water |
| | 10 grams | 5% NaOH |
| Internal Phase: | 7.5 grams | Amine modified polyether acrylate oligomer |
| | 17.5 grams | Diethylene glycol dimethacrylate |
| | 1.8 grams | Monobutyl maleate |
| | 247.5 grams | Butyl diphenyl methane and butyl diphenyl ethane blend |
| | 1 gram | 2,2'-azobis(2,4-dimethylvaleronitrile) |
| | 2 grams | (2,2'-azobismethylbutyronitrile) |
| | 2.5 grams | Indolyl red |

The internal phase is mixed with stirring for one hour under a nitrogen blanket and brought to a temperature of 65° C. and maintained at this temperature. The water phase components are also mixed with stirring. The oil phase components are blended at high speed. The water phase is added to the internal phase and milled for an additional two hours at 65° C. to achieve a median particle size of about 3.6 μm. The temperature was maintained along with continuous stirring for four hours; and then heating was increased to 90° C. for eight hours.

The resultant oil in water capsules had a size of about 4.3 μm.

Similar capsules are also preparable using diethylene glycol diacrylate.

Example 2

| | | |
|---|---|---|
| Water Phase: | 300 grams | Water |
| | 25 grams | acrylic acid butyl acrylate copolymer |
| | 2 grams | 4,4'-azobis(4-cyano valeric acid) |
| | 10 grams | 5% NaOH |
| Internal Phase: | 247.5 grams | Butyl diphenylmethane and butyl diphenylethane blend |
| | 2.5 grams | Indolyl red dye |
| | 7.5 grams | Amine modified polyether acrylate oligomer (CN 551 ™, Sartomer, Exton, Pennsylvania) |
| | 17.5 grams | Ethylene glycol dimethacrylate |
| | 1.5 grams | 2,2'-azobis(2,4-dimethylvaleronitrile) |
| | 0.5 grams | (2,2'-azobismethylbutyronitrile) |
| | 1.0 grams | 1,1'-azobis(cyanocyclohexane |
| | 1.8 grams | Monobutylmaleate |

The internal phase is mixed with stirring for one hour at 70° C. under a nitrogen blanket. The water phase components are also blended with stirring. The oil phase components are blended at high speed. The water phase is added to the internal phase and milled for an additional two hours at 70° C. to achieve a median particle size of 3.7 μm. The temperature was maintained along with continuous stirring for four hours and then heating was increased to 90° C. for eight hours. The resultant oil in water capsules had a size of about 4.2 μm.

Example 3

| Wall Material | Permeability of resultant capsules (methanol extraction) |
|---|---|
| Diethylene glycol dimethacrylate | 3.77 |
| Diethylene glycol diacrylate | 15.89 |
| Aromatic urethane acrylate | 0.00 |
| Urethane acrylate | 17.80 |
| Tetraethylene glycol diacrylate | 41.36 |
| 1,4-butane diol diacrylate | 1.61 |
| Ethylene glycol dimethacrylate | 0 |

Permeability can be controlled through wall material selection, through control of the degree of cross-linking, by controlling temperature of cross-linking, by controlling length of time of cross-linking, or with UV initiated systems by controlling intensity of UV light and duration.

Permeability is determined by extracting for 5 seconds using methanol and measuring relative coloration of extracted dye.

Example 4

| | | | |
|---|---|---|---|
| Water Phase: | 300 | grams | Water |
| | 25 | grams | Butyl diphenyl methane and butyl diphenyl ethane blend |
| | 10 | grams | 5% NaOH |
| | 2 | grams | 4,4'-azobis(4-cyano valeric acid) |
| Internal Phase: | 247.5 | grams | Dioctyl phthalate |
| | 2.5 | grams | Indolyl red |
| | 7.5 | grams | Amine modified polyester acrylate oligomer |
| | 17.5 | grams | Tetraethylene glycol diacrylate |
| | 1.8 | grams | Monobutyl maleate |
| | 1 | gram | 2,2'-azobis(2,4-dimethylvaleronitrile) |
| | 2 | grams | (2,2'-azobismethylbutyronitrile) |
| | 2.5 | grams | Indolyl red |

Following the procedure described in Example 1, capsules were obtained 7.8 μm median diameter.

Example 5

Water in Oil Capsules

| | | | |
|---|---|---|---|
| Oil Phase: | 247.5 | grams | Butyl diphenylmethane and butyl diphenyl ethane blend |
| | 3.3 | grams | Amine modified polyether acrylate oligomer (CN 551 ™, Sartomer, Exton, Pennsylvania) |
| | 7.7 | grams | Ethylene glycol dimethacrylate |
| | 0.9 | grams | 2,2'-azobis(2,4-dimethylvaleronitrile) |
| | 0.3 | grams | (2,2'-azobismethylbutyronitrile) |
| | 0.8 | grams | Monobutyl maleate |
| Water Phase: | 66 | grams | Water |
| | 5.5 | grams | Acrylic acid butyl acrylate copolymer |
| | 2.8 | grams | 5% NaOH |
| | 0.4 | grams | 4,4'-azobis(4-cyano valeric acid) |
| | 3 | drops | Blue dye |

The oil phase was mixed and heated to 70° C. for one hour. The water phase components are also mixed with stirring. The water phase is added to the oil phase and milled for 2 hours at 65° C. under a nitrogen blanket. Gradually increase the temperature to 70° C. and maintain with stirring for about 9 hours. Unaggregated capsules were observed.

Example 6

| | | | |
|---|---|---|---|
| Oil Phase: | 330 | grams | Toluene |
| | 3.3 | grams | Amine modified polyether acrylate oligomer |
| | 7.7 | grams | Ethylene glycol dimethacrylate |
| | 1.2 | grams | 2,2'-azobis(2,4-dimethylvaleronitrile) |
| | 0.8 | grams | Monobutyl maleate |
| Water Phase: | 66 | grams | Water |
| | 5.5 | grams | Acrylic butylacrylate copolymer |
| | 2.8 | grams | 5% NaOH |
| | 1 | drop | Blue dye (Brilliant Bond Blue) |

Using the procedure of Example 5 except initial heating was carried out at 65° C., water in oil capsules were observed.

Example 7

| | | | |
|---|---|---|---|
| Oil Phase (External Phase): | 400 | grams | Toluene |
| | 3.3 | grams | Amine modified polyether acrylate oligomer (CN 551 ™, Sartomer, Exton, Pennsylvania) |
| | 7.7 | grams | Trimethylolpropane triacrylate |
| | 0.9 | grams | (2,2'-azobismethylbutyronitrile) |
| | 0.8 | grams | Monobutyl maleate |
| Internal Phase: | 66 | grams | Water |
| | 5.5 | grams | Acrylic butylacrylate copolymer |
| | 2.8 | grams | 5% NaOH |
| | 0.8 | grams | 4,4'-azobis(4-cyano valeric acid) |
| | 1 | drop | Blue dye |

Using the procedure of Example 5 except initial heating was carried out at 60° C., water in oil capsules were observed.

Example 8

| | | | |
|---|---|---|---|
| Water Phase | 2.5 | grams | polyacrylic acid |
| | 75 | grams | Water |
| Oil Phase: | 12.5 | grams | Amine modified polyether acrylate |
| | 12.5 | grams | Diethylene glycol dimethacrylate |
| | 0.25 | grams | Monobutyl maleate |
| | 1.0 | grams | 2,2'-azobis(2,4-dimethylvaleronitrile) |
| | 2.5 | grams | Indolyl red dye (I6B) |
| | 221.75 | grams | Soybean oil methyl ester |

The oil phase components were placed in a 25° C. steel reactor, with mixing at 250 rpm under a nitrogen blanket at 200 cc/mm. The oil phase was heated to 70° C. for 90 minutes. The water phase was added and the blend milled at 2500 rpm. 15 grams of NaOH were added dropwise. Stirring was continued and solution maintained at 70° C. for 90 minutes. Heating was then increased to 90° for twelve hours.

Measured permeability of formed microcapsules was 52%.

Example 9

| Oil Phase | 7.5 grams | Amine modified polyether acrylate |
|---|---|---|
| | 17.5 grams | Ethylene glycol dimethacrylate |
| | 1.8 grams | Monobutyl maleate |
| | 223.7 grams | Fragrance oil (lemon oil) |
| | 1 gram | 2,2'-azobis(2,4-dimethylvaleronitrile) |
| | 1 gram | (2,2'-azobismethylbutyronitrile) |
| | 1 gram | 1,1'-azobis(cyanocyclohexane |
| Water Phase | 300 grams | Distilled water |
| | 25 grams | Polyacrylic acid |
| | 10 grams | 5% NaOH |
| | 2 grams | 4,4'-azobis(4-cyano valeric acid) |

Mix the oil phase and stir for 1 hour under a nitrogen blanket. Stir at 300 rpm. Add water phase and stir with magnetic stirrer. Heat to 70° C. for about one hour. Mill at 70° C. for 3 hours increasing speed to 400 rpm. End of milling size is 12.4 rpm. Heat with agitation to 90° C. and hold for 8 hours. Oil in water capsules encapsulate lemon oil.

Example 10

| Oil Phase | 12.5 grams | CN 550 ™ amine modified polyether acrylate oligomer (Sartomer, Exton, Pennsylvania) |
|---|---|---|
| | 12.5 grams | Diethylene glycol dimethacrylate |
| | 0.25 grams | Monobutyl maleate |
| | 2.5 grams | Red dye I6B |
| | 1 gram | 2,2'-azobis(2,4-dimethylvaleronitrile) |
| | 221.75 grams | Soybean oil methyl ester |
| Water Phase | 25 grams | polyacrylic acid |
| | 475 grams | Water |

Other amine modified polyether acrylate oligomers can typically be freely substituted in the examples. Blend oil phase with stirring at 250 rpm under a nitrogen blanket at 200 cc/mm. Heat from 25° C. to 70° C. for one hour. Hold for an additional thirty minutes. Add water phase and mill at 2500 rpm. Add 15 grams of 5% NaOH. Stir at 500 rpm and hold at 70° C. for 90 minutes. Increase temperature to 90° C. for 12 hours.

Measured permeability of the capsules was 52%.

Example 11

| Oil Phase | 10 grams | CN 501 ™ amine modified polyether acrylate oligomer (Sartomer, Exton, Pennsylvania) |
|---|---|---|
| | 15 grams | Diethylene glycol diacrylate |
| | 0.25 grams | Monobutyl maleate |
| | 2.5 grams | Red dye I6B |
| | 0.5 grams | 2,2'-azobis(2,4-dimethylvaleronitrile) |
| | 221.75 grams | Soybean oil and methyl ester |
| Water Phase | 25 grams | polyacrylic acid |
| | 475 grams | Water |

Oil phase is added to the reactor and mixed at 250 rpm under a nitrogen blanket at 200 cc/mm. The solution is heated from 25° C. to 65° C. for sixty minutes. The temperature is held at 65° C. for 60 minutes. The water phase is added and mixed at 2500 rpm. Temperature is held at 65° C. for 16 hours with high speed stirring.

Example 12

| Oil Phase | 12.5 grams | amine modified polyether acrylate oligomer |
|---|---|---|
| | 25 grams | Aliphatic urethane acrylate Tg 90° C. |
| | 2.7 grams | Monobutyl maleate |
| | 2.5 grams | Red dye, I6B |
| | 1 gram | 2,2'-azobis(2,4-dimethylvaleronitrile) |
| | 2 grams | (2,2'-azobismethylbutyronitrile) |
| | 247.5 grams | sec-butyl diphenyl methane and sec-buty diphenyl ethane |
| Water Phase | 25 grams | Polyacrylate |
| | 300 grams | Water |
| | 9 grams | 5% NaOH |
| | 2 grams | 4,4'-azobis(4-cyano valeric acid) |

Blend and heat the materials according to the process of Example 11.

Example 13

| Oil Phase | 12.5 grams | amine modified polyether acrylate oligomer |
|---|---|---|
| | 12.5 grams | Trimethylol propane triacrylate |
| | 2.7 grams | Monobutyl maleate |
| | 2.6 grams | I6B, red dye |
| | 1 gram | 2,2'-azobis(2,4-dimethylvaleronitrile) |
| | 2 grams | (2,2'-azobismethylbutyronitrile) |
| | 247.5 grams | sec-butyl diphenyl methane and sec-buty diphenyl ethane |
| Water Phase | 25 grams | Acrylic acid butyl acrylate copolymer |
| | 300 grams | Water |
| | 9 grams | 5% NaOH |
| | 2 grams | 4,4'-azobis(4-cyano valeric acid) |

The oil phase is placed in a reactor at 25° C. and stirred at 300 rpm under a nitrogen blanket at 200 cc/min. The oil phase is heated from 25° C. to 65° C. for an hour and held at 65° C. for a n hour and held at 65° C. for an additional hour. The water phase is added and then milling started at 3000 rpm and continued for two hours. End of mill size 50% at 7.1 microns. 200 grams of water is added and mixing contained at 3000 rpm. Temperature is held at 65° C. for five hours and then the temperature is increased to 90° C. for about 9 hours.

Example 14

| Oil Phase | 7.5 grams | CN 551 ™ Amine modified polyether acrylate oligomer (Sartomer, Exton, Pennsylvania) |
|---|---|---|
| | 17.5 grams | Pentaerythritol triacryate |
| | 1.8 grams | Monobutyl maleate |
| | 2.5 grams | I6B, red dye |
| | 247.5 grams | sec-butyl diphenyl methane and sec-butyl diphenyl ethane |
| | 1 gram | 2,2'-azobis(2,4-dimethylvaleronitrile) |
| | 1 gram | (2,2'-azobismethylbutyronitrile) |
| Water Phase | 25 grams | Acrylic acid butyl acrylate copolymer |
| | 2 grams | 4,4'-azobis(4-cyano valeric acid) |
| | 300 grams | Water |
| | 10 grams | 5% NaOH |

Blend and heat the materials according to the process of Example 13.

Example 15

| Oil Phase | 7.5 grams | Amine modified polyether acrylate |
| | 17.5 grams | Ethylene glycol dimethacrylate |
| | 1.8 grams | Monobutyl maleate |
| | 223.7 grams | Pine oil (or optionally pine oil dissolved in toluene) |
| | 3 grams | 1-hydroxycyclohexyl phenyl ketone |
| Water Phase | 300 grams | Distilled water |
| | 25 grams | Polyacrylic acid |
| | 10 grams | 5% NaOH |

Mix the oil phase and stir for 1 hour under a nitrogen blanket. Stir at 300 rpm. Add water phase and stir with magnetic stirrer. At the same time, expose to UV light for about three hours. Mill at 70° C. for 3 hours increasing speed to 400 rpm while continuing UV exposure. Use end of milling size of 12.4.

Example 16

| Oil Phase | 7.5 grams | CN 551 ™ amine modified polyether acrylate oligomer (Sartomer, Exton, Pennsylvania) |
| | 17.5 grams | CN 999 ™ aromatic difunctional urethane acrylate (Sartomer, Exton, Pennsylvania) |
| | 1.8 grams | Monobutyl maleate |
| | 2.5 grams | I6B, red dye |
| | 247.5 grams | sec-butyl diphenyl methane and sec-butyl diphenyl ethane |
| | 1 gram | 2,2'-azobis(2,4-dimethylvaleronitrile) |
| | 2 grams | benzoyl peroxide |
| Water Phase | 2.5 grams | Acrylic acid butyl acid copolymer |
| | 2 grams | 4,4'-azobis(4-cyano valeric acid) |
| | 300 grams | Water |
| | 10 grams | 5% NaOH |

Blend and heat the materials using the process of Example 13. End of milling size is about 50% at 3.26 microns. Optionally, flavorants, sweeteners, cleaning oils, scents, pharmaceutical oils, antimicrobials, phase change materials, polishing oils, fertilizers, herbicides, perfumed oils, fragrant oils, oil soluble adhesive materials can be substituted in any of the examples for amount of the dye or for the solvent to prepare adhesive-containing or fragrance-containing or flavorant-containing, as the case may be, microcapsules. The oils should be preferably dispersible or soluble in the internal phase.

Unless otherwise indicated herein, all measurements are on the basis of weight and in the metric system. The principles, preferred embodiments and modes of operation of the present invention have been described in the foregoing specification. The invention which is intended to be protected herein, however, is not to be construed as limited to the particular forms disclosed, since three are to be regarded as illustrative rather than restrictive variations and changes can be made by those skilled in the art without departing from the spirit and scope of the invention.

What is claimed is:

1. A process for preparing microcapsules encapsulating a water phase, the process comprising:

dispersing an oil soluble amine modified ethoxylated trimethylol propane triacrylate and an oil soluble diethylene glycol dimethacrylate along with free radical initiator and an organic acid into an oil phase which is a nonsolvent for the water phase; the organic acid selected from the group consisting of monoalkyl maleate, alkyl benzene sulfonic acid, and alkyldiphenoxide sulfonic acid;

a first heating step comprising, heating for time and temperature sufficient to oligomerize the amine modified ethoxylated trimethylol propane triacrylate and a diethylene glycol dimethacrylate forming a pre-polymer;

adding to the oil phase a water phase comprising a dispersion in water of a polyacrylic or polymethacrylic acid, a core material, and an emulsifying agent;

emulsifying the water phase into the oil-phase forming droplets of the water phase dispersed in the oil phase;

a second heating step comprising, heating for a time and temperature sufficient to decompose at least a portion of the free radical initiator in the oil phase;

thereby forming microcapsule wall material at the interface of the water and oil phases the microcapsules encapsulating the water phase droplets; and a third heating step comprising heating to at least 90° C. for at least three hours to polymerize the wall material.

2. The process according to claim 1 wherein a free radical initiator is selected from an azo or peroxy initiator.

3. The process according to claim 1 wherein the oligomerization is accomplished by heating, in the first heating step, to at least 55° C. for at least one hour to form the prepolymer.

4. The process according to claim 1 wherein the emulsifying agent is selected from polyacrylic acid, polymethacrylic acid, alkyl succinamate, alkylarylsulfonic acid salt or alkyl sulfate salt.

5. The process according to claim 1 wherein a second initiator is added in addition to the water phase and wherein the initiator in the oil phase decomposes at a first temperature and the initiator in the water phase decomposes at a second temperature.

6. The process according to claim 5 wherein the initiators in the oil phase and the water phase are the same or different.

7. A process for preparing microcapsules encapsulating a water phase, the microcapsules obtained by steps consisting of:

providing an oil phase and a water phase containing a free radical initiator in at least one of said phases, dispersing an oil soluble amine modified polyfunctional polyvinyl monomer or oligomer and an oil soluble bi- or polyfunctional vinyl monomer or oligomer and an organic acid into the oil phase; the organic acid selected from the group consisting of monoalkyl maleate, alkyl benzene sulfonic acid, and alkyldiphenoxide sulfonic acid;

adding to the internal phase oil the water phase which further comprises a dispersion in water of an anionic emulsifier, and emulsifying the water phase into the oil phase forming droplets of the water phase in the oil phase;

a first heating step comprising, heating for a time and temperature sufficient to decompose the free radical initiator in at least the oil or water phase, and sufficient to oligomerize or further oligomerize the amine modified polyfunctional polyvinyl monomer or oligomer and oil soluble bi- or polyfunctional vinyl monomer or oligomer forming a pre-polymer and thereby forming microcapsule wall material at the interface of the water and oil phases;

and a second heating step comprising heating to a temperature equal to or greater than the first heating step temperature for a time sufficient to polymerize the wall material.

8. The process according to claim 7 wherein a free radical initiator is selected from an azo or peroxy initiator.

9. The process according to claim 7 wherein the oligomerization is accomplished by heating, in the first heating step, to at least 55° C. for at least one hour to form the prepolymer.

10. The process according to claim 7 wherein the amine modified polyvinyl monomer is selected from amine modified ethoxylated trimethylol propane triacrylate, diacrylate amine, dimethacrylate amine, amine modified polyetheracrylate, and amine modified polyethermethacrylate.

11. The process according to claim 7 wherein the bi- or polyfunctional vinyl monomer or oligomer is selected from a polyacrylate, a polymethacrylate, a dimethacrylate, a diacrylate, a triacrylate, diethylene glycol dimethacrylate, pentaerythritoltriacrylate, trimethylol propane triacrylate, urethane diacrylate, urethane dimethacrylate, ethoxylated aliphatic difunctional urethane acrylate, and ethoxylated aliphatic difunctional urethane methacrylate.

12. The process according to claim 7 wherein the emulsifier is selected from polymethacrylic acid, acrylic acid butyl acrylate copolymer, alkyl succinamates, alkylaryl sulfonic acid salts or alkyl sulfate salts.

13. The process according to claim 7 wherein the second heating step comprises heating to at least 90° C. for at least three hours.

14. The process according to claim 7 wherein initiator is added to both the oil and water phases.

15. The process according to claim 14 wherein the initiator in the oil phase decomposes at a first temperature and the initiator in the water phase decomposes at a second temperature.

16. The process according to claim 14 wherein the initiators in the oil and water phases are the same or different.

* * * * *